United States Patent
Szilagyi et al.

(12)

(10) Patent No.: US 6,425,694 B1
(45) Date of Patent: Jul. 30, 2002

(54) FIBER OPTIC RECEPTACLE WITH PROTECTIVE SHUTTER

(75) Inventors: B. Daniel Szilagyi, Naperville; Igor Grois, Northbrook, both of IL (US)

(73) Assignee: Molex Incorporated, Lisle, IL (US)

( * ) Notice: Subject to any disclaimer, the term of this patent is extended or adjusted under 35 U.S.C. 154(b) by 134 days.

(21) Appl. No.: 09/677,376

(22) Filed: Sep. 18, 2000

(51) Int. Cl.⁷ .................................................. G02B 6/36
(52) U.S. Cl. .............................. 385/76; 385/53; 385/55; 385/78; 385/81; 385/139
(58) Field of Search .............................. 385/76, 53, 55, 385/78, 81, 139, 70, 59, 60, 54, 147, 134

(56) References Cited

U.S. PATENT DOCUMENTS 6,004,043 A * 12/1999 Abendschein et al. ........ 385/76
6,079,881 A * 6/2000 Roth et al. ..................... 385/76
6,081,647 A * 6/2000 Roth et al. ................... 385/139
6,108,482 A * 8/2000 Roth .......................... 385/139
6,240,229 B1 * 5/2002 Roth ............................ 385/53

\* cited by examiner

*Primary Examiner*—Mohammad Sikder
(74) *Attorney, Agent, or Firm*—A. A. Tirva

(57) ABSTRACT

A receptacle is provided for receiving a fiber optic connector along an optic axis. The receptacle includes a housing having a forward open end for receiving the fiber optic connector inserted thereinto on the optic axis. An outside wall extends rearwardly from the open end of the housing. A shutter member is pivotally mounted on the housing adjacent the open end thereof and is pivotally movable to close and open the open end. The shutter member extends across the optic axis when the shutter member is closed. The shutter member is pivotable away from the optic axis to a position juxtaposed against the rearwardly extending outside wall.

21 Claims, 2 Drawing Sheets

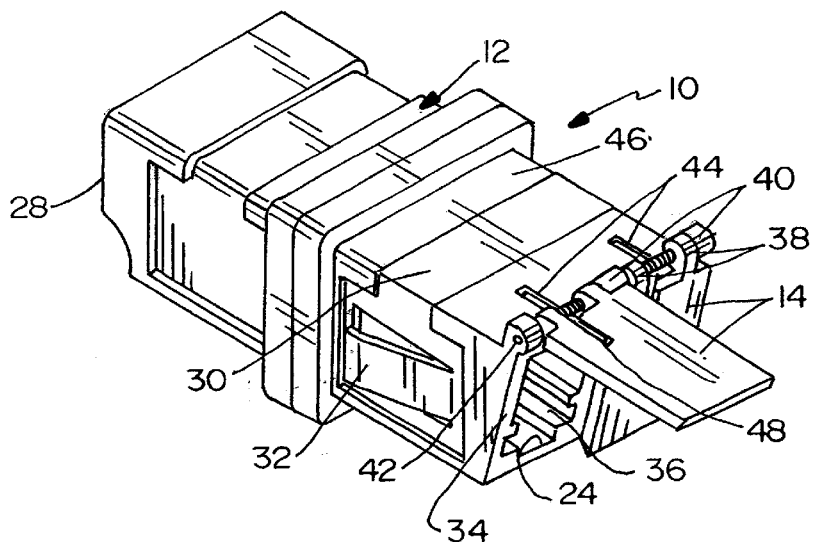
FIG.3
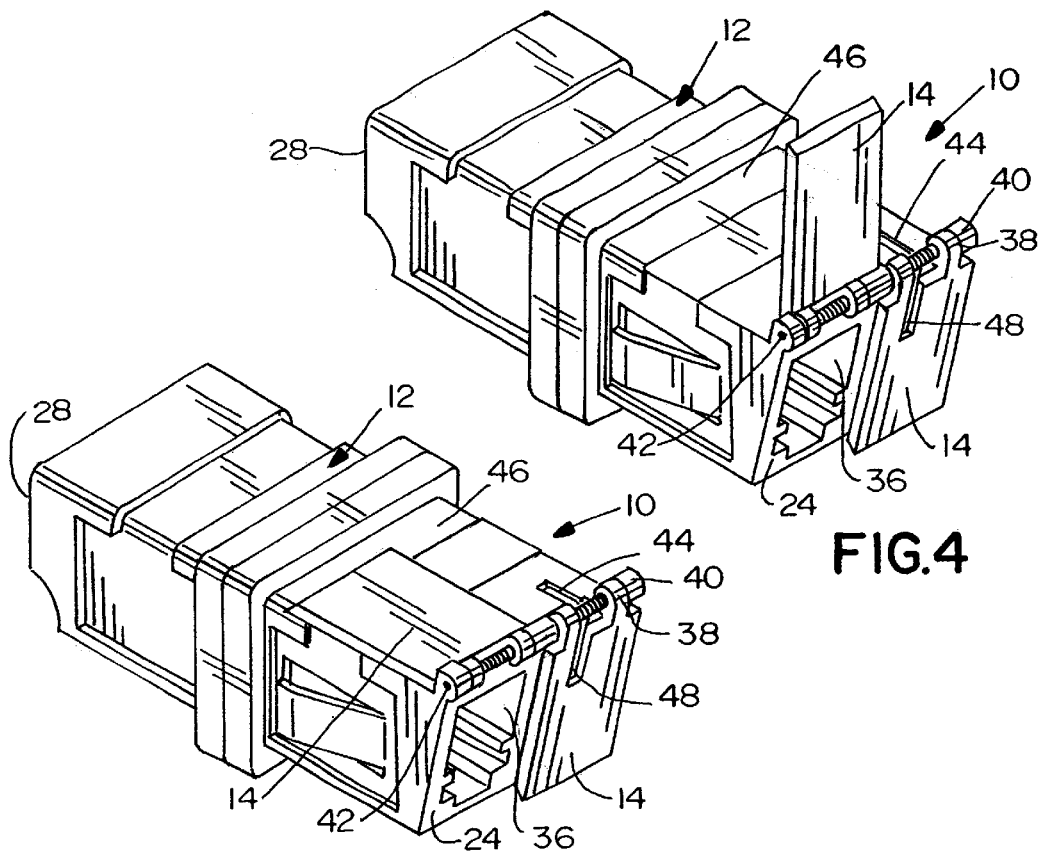
FIG.4
FIG.5

FIBER OPTIC RECEPTACLE WITH PROTECTIVE SHUTTER

FIELD OF THE INVENTION

This invention generally relates to the art of fiber optic connectors and, particularly, to a receptacle, such as an adapter, for receiving a fiber optic connector at one or both ends of the adapter.

BACKGROUND OF THE INVENTION

Fiber optic connectors of a wide variety of designs have been employed to terminate optical fiber cables and to facilitate connection of the cables to other cables or other optical fiber transmission devices. A typical optic fiber connector includes a ferrule which mounts and centers an optical fiber or fibers within the connector. The ferrule may be fabricated of such material as ceramic. A ferrule holder or other housing component of the connector embraces the ferrule and may be fabricated of such material as molded plastic. A spring may be disposed within the housing or ferrule holder such that the ferrule is yieldably biased forwardly for engaging another fiber-mounting ferrule of a mating connecting device.

A pair of fiber optic connectors or a connector and another optical fiber transmission device often are mated in an adapter which centers the fibers to provide low insertion losses. The adapter couples the connectors together so that their encapsulated fibers connect end-to-end. The adapter may be an in-line component, or the adapter can be designed for mounting in an opening in a panel, backplane, circuit board or the like.

Various problems are encountered when terminating optical fibers in fiber optic connectors versus terminating electrical conductors in electrical connectors, when situations arise wherein a fiber end of an "active" fiber optic connector is exposed. A-typical situation might arise when one of the fiber optic connectors at one end of an adapter is removed, leaving the other "active" fiber optic connector in the adapter.

In particular, an exposed fiber end may be damaged by adverse environmental hazards, and the accumulation of dust and dirt may impair the optical transmission capabilities of the fiber. Another very important problem is to protect an operator's eyes from dangerous light beams from the exposed end of an active optical fiber. For instance, an operator's eyes may be damaged from dangerous light beams exiting an unprotected receptacle or adapter.

Heretofore, dust covers, end caps or spring-loaded shutters have been used to close an open end of an adapter to, thereby, cover the exposed fiber ends to protect the fiber ends from adverse environmental hazards and to prevent light energy from the fiber ends from exiting the adapter. One such spring-loaded shutter is pivotally mounted on the adapter adjacent the open end thereof and is pivotally movable to close and open the open end. The shutter member extends across the optic axis of the connector/adapter assembly when the shutter member is closed. The shutter member may be pivotable away from the optic axis to its open condition.

Such pivotally mounted shutters as described above can be mounted either on the outside or the inside of the adapter. Inside shutters cause problems because they are extremely difficult to assemble within the adapter housing, keeping in mind that fiber optic connectors, adapters and the like are very small assemblies. Outside shutters cause problems because they are extremely difficult to open and othervise manipulate while simultaneously trying to insert a connector into the adapter. In some instances, two hands are required to open the shutter while grasping the adapter, leaving little manual manipulation for inserting the connector. The invention herein is directed to solving these various problems, particularly by providing a unique outside shutter which can be pivoted to an extent that it can be pinched and held open against the adapter housing by only one hand of the operator.

SUMMARY OF THE INVENTION

An object, therefore, of the invention is to provide a new and improved receptacle for receiving a fiber optic connector along an optic axis.

In the exemplary embodiment of the invention, the receptacle includes a housing having a forward end for receiving the fiber optic connector inserted thereinto on the optic axis. The housing has an outside wall extending rearwardly from the open end. A shutter member is pivotally mounted on the housing adjacent the open end and is pivotally movable to close and open the open end. The shutter member extends across the optic axis when the shutter member is closed. The shutter member is pivotable away from the optic axis to a position juxtaposed against the rearwardly extending outside wall. In essence, in the exemplary embodiment, the shutter member is pivotable approximately 270° away from its closed position to its open position.

As disclosed herein, the receptacle is sized and shaped for grasping between an operator's thumb and forefinger, with the shutter member pinched: against the rearwardly extending outside wall of the housing. The shutter member is generally rectangular and generally planar. The forward open end of the housing is generally rectangular, and the rearwardly extending outside wall is generally flat. The shutter member is pivotally mounted on the housing at one edge of the generally rectangular open end.

According to the disclosed embodiment, the receptacle comprises an adapter having the open end at one end thereof and an end face at an opposite end thereof for mating with an associated fiber optic transmission means such as a complementary mating fiber optic connector. The adapter is shown with a pair of the forward open ends in side-by-side relationship, with one of the shutter members independently pivotally mounted on the housing adjacent each open end.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figure and in which:

FIGS. 3 and 4 are perspective views similar to that of FIG. 1, but showing sequential views of opening one of the shutter members; and FIG. 5 is a view similar to that of FIGS. 1, 3 and 4, but showing the one shutter member in fully open position juxtaposed against a top outside wall of the receptacle housing.

DETAILED DESCRIPTION OF THE PREFERRED EMBODIMENT

Figure 1:
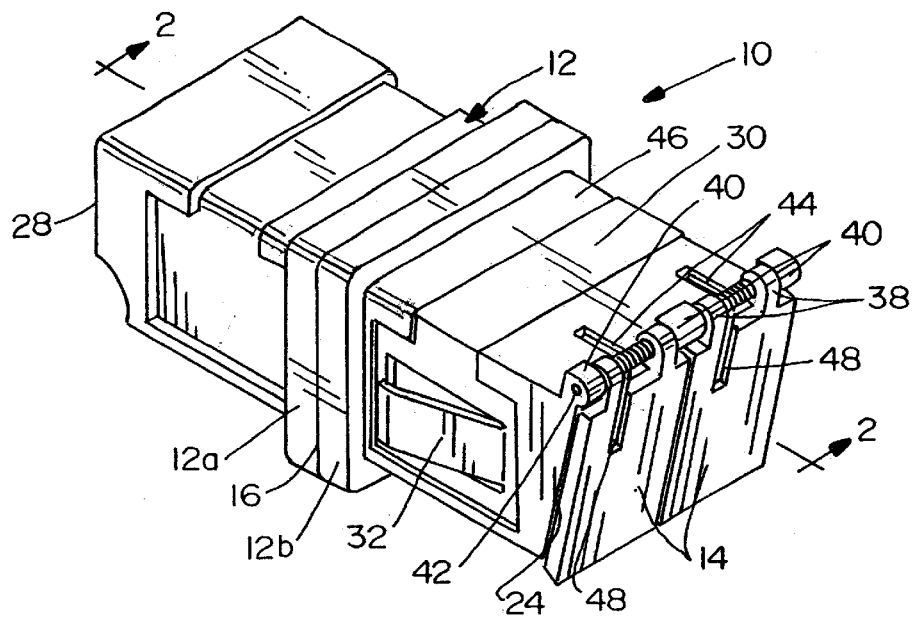
FIG. 1 is a front perspective view of a receptacle in the form of an adapter for receiving a pair of fiber optic connectors and incorporating a pair of shutters embodying the concepts of the invention, with the shutters shown in their closed positions.
Figure 2:
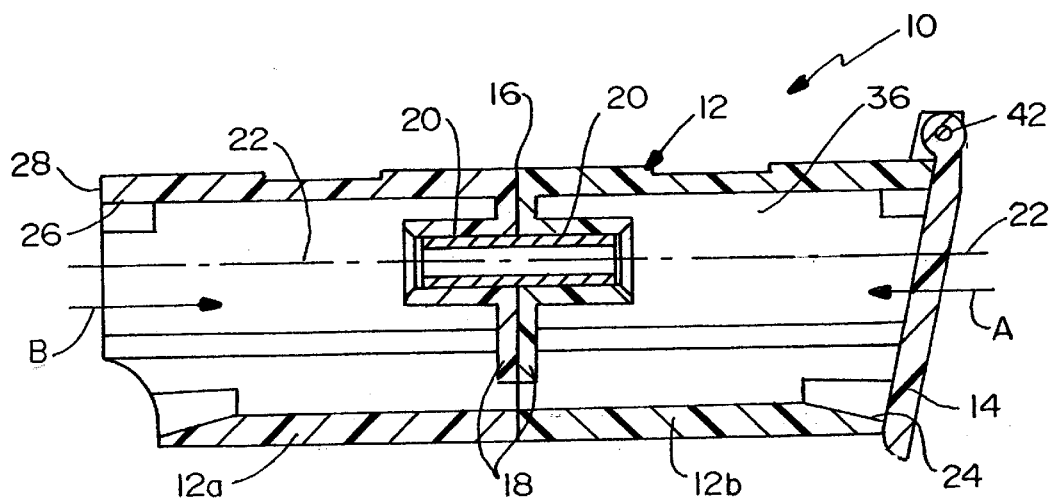
FIG. 2 is an axial section taken generally along line 2—2 of FIG. 1.

Referring to the drawings in greater detail, and first to FIGS. 1 and 2, the invention is disclosed herein as incorporated in a double-ended receptacle in the form of an adapter, generally designated 10, which includes a housing, generally designated 12, and a pair of shutter members 14 pivotally mounted on the housing. Although the invention is disclosed in an adapter, the concepts of the invention are equally applicable for a wide range of receptacles for receiving a fiber optic connector or other optical fiber transmission device along an optic axis. Therefore, the term "fiber optic connector" is used herein and in the claims hereof in a generic sense to include a variety of optical fiber transmission devices.

With that understanding, adapter housing 12 is generally rectangular in cross--section and includes two parts 12a and 12b adhered together at a joint 16 so that the housing is a unitary structure. As seen best in FIG. 2, both housing parts have abutting interior cross walls 18 and aligned interior cylindrical bosses 20 which receive the projecting ferrules of a pair of fiber optic connectors so that the encapsulated fibers are connected end-to-end along an optic axis 22. The unitary housing defines a forward open end 24 for receiving a first fiber optic connector in the direction of arrow "A", and a rear open end 26 (FIG. 2) in a rear end face 28 for receiving a second or mating fiber optic connector in the direction of arrow "B". A metal latch member 30 having a pair of side flexible latch arms 32 may be provided on housing 12 for mounting the adapter in an opening in a panel or the like.

As stated above, adapter 10 is a double-ended receptacle for interconnecting two pairs of mating fiber optic connectors. In other words, as best seen in FIGS. 3–5, a front face 34 of housing 12 has a pair of the forward open ends 24 which expose a pair of through passages 36 extending through the housing and closable by shutter members 14. Each passage 36 has cross walls 18 and cylindrical bosses 20 therein as described above in relation to FIG. 2.

Each shutter member 14 includes a pair of apertured bosses 38 aligned with apertured bosses 40 at a top edge of the forward open end of housing 12. A pivot rod 42 extends through the aligned apertured bosses 38 and 40 of the shutter members and the housing, respectively, so that the shutter members are pivotally movable to close and open the open end of the housing. FIG. 1 shows both shutter members in their closed position whereby the shutter members extend across optic axes 22 (FIG. 2). A pair of coil springs are wrapped around pivot rod 42 and include first ends 44 engaging a top wall 46 of the housing and opposite ends 48 for engaging shutter members 14. The springs bias the shutter members toward their closed positions as shown in FIG. 1. Top wall 46 of the housing forms an outside wall extending rearwardly from forward open end 24 of the housing. The top wall is generally flat, and each shutter member is generally planar or flat.

FIGS. 3–5 show one of the shutter members 14 (the left-hand shutter member in the drawings) being pivoted upwardly and away from its closed position of FIG. 1. Specifically, in the closed position shown in FIGS. 1 and 2, the shutter members extend transversely across optic axis 22 to close the forward open end of the housing. FIG. 3 shows the one shutter member pivoted upwardly about pivot rod 42 in the direction of arrow "C" to a position approximately 900 away from its closed position. FIG. 4 shows the one shutter member 14 pivoted further to an upwardly extended position approximately 1800 from its closed position of FIG. 1. FIG. 5 shows the one shutter member 14 pivoted all the way to its maximum open position whereat the shutter member is juxtaposed against rearwardly extending outside wall 46 of housing 12. This extreme position is approximately 270° from the closed position of the shutter member shown in FIG. 1. In the fully open position of FIG. 5, it can be understood that adapter 10 can be grasped between an operator's thumb and forefinger, with the open shutter member pinched against rearwardly extending outside wall 46 without involving any other manual manipulation by the operator. This frees the operator's other hand to manipulate other components, such as inserting a fiber optic connector into passage 36 which the opened shutter member has now exposed.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A receptacle for receiving a fiber optic connector along an optic axis, comprising:
    a housing having a forward open end for receiving the fiber optic connector inserted thereinto on said optic axis and an outside wall extending rearwardly from the open end; and
    a shutter member pivotally mounted on the housing adjacent to said open end and being pivotally movable to close and open said open end, the shutter member extending across the optic axis when the shutter member is closed, and the shutter member being pivotable away from the optic axis to a position juxtaposed against said rearwardly extending outside wall.

2. The receptacle of claim 1 wherein said housing is sized and shaped for grasping between an operator's thumb and forefinger with the shutter member pinched against said rearwardly extending outside wall.

3. The receptacle of claim 1 wherein said shutter member is generally planar.

4. The receptacle of claim 3 wherein said rearwardly extending outside wall is generally flat.

5. The receptacle of claim 1 wherein said shutter member is generally rectangular.

6. The receptacle of claim 5 wherein said forward open end of the housing is generally rectangular.

7. The receptacle of claim 6 wherein said shutter member is pivotally mounted on the housing at one edge of the generally rectangular open end.

8. The receptacle of claim 1 wherein said housing includes a pair of said forward open ends in side-by-side relationship, with one of said shutter members independently pivotally mounted on the housing adjacent each open end.

9. The receptacle of claim 1 wherein said receptacle comprises an adapter having said open end at one end thereof and an end face at an opposite end thereof for mating with an associated fiber optic transmission means.

10. A receptacle for receiving a fiber optic connector along an optic axis, comprising:
    a housing having a generally rectangular forward open end for receiving the fiber optic connector inserted thereinto on said optic axis and a generally flat outside wall extending rearwardly from the open end; and a generally rectangular, generally planar shutter member pivotally mounted on the housing at one edge of the generally rectangular open end and being pivotally movable to close and open said open end, the shutter member extending across the optic axis when the shutter member is closed, and the shutter member being pivotable away from the optic axis to a position juxtaposed against said rearwardly extending outside wall.

11. The receptacle of claim 10 wherein said housing is sized and shaped for grasping between an operator's thumb and forefinger with the shutter member pinched against said rearwardly extending outside wall.

12. The receptacle of claim 10 wherein said receptacle comprises an adapter having said open end at one end thereof and an end face at an opposite end thereof for mating with an associated fiber optic transmission means.

13. The receptacle of claim 10 wherein said housing includes a pair of said forward open ends in side-by-side relationship, with one of said shutter members independently pivotally mounted on the housing adjacent each open end.

14. A receptacle for receiving a fiber optic connector along an optic axis, comprising:

a housing having an open end for receiving the fiber optic connector inserted thereinto on said optic axis; and a shutter member pivotally mounted on the housing adjacent to said open end and being pivotally movable to close and open said open end, the shutter member extending across the optic axis when the shutter member is in a closed position, and the shutter member being pivotable approximately 270° away from said closed position to an open position.

15. The receptacle of claim 14 wherein said shutter member is generally rectangular.

16. The receptacle of claim 15 wherein said forward open end of the housing is generally rectangular.

17. The receptacle of claim 16 wherein said shutter member is pivotally mounted on the housing at one edge of the generally rectangular open end.

18. The receptacle of claim 15 wherein said shutter member is generally planar.

19. The receptacle of claim 14 wherein said housing includes a pair of said forward open ends in side-by-side relationship, with one of said shutter members independently pivotally mounted on the housing adjacent each open end.

20. The receptacle of claim 14 wherein said receptacle comprises an adapter having said open end at one end thereof and an end face at an opposite end thereof for mating with an associated fiber optic transmission means.

21. The receptacle of claim 14 wherein said housing is sized and shaped for grasping between an operator's thumb and forefinger with the shutter member pinched against the outside of the housing.

* * * * *